(12) United States Patent
Li et al.

(10) Patent No.: US 12,476,280 B2
(45) Date of Patent: Nov. 18, 2025

(54) ELECTROLYTE FOR LITHIUM-ION BATTERY, LITHIUM-ION BATTERY, BATTERY MODULE, BATTERY PACK, AND APPARATUS

(71) Applicant: CONTEMPORARY AMPEREX TECHNOLOGY (HONG KONG) LIMITED, Hong Kong (CN)

(72) Inventors: Yongkun Li, Ningde (CN); Kai Wu, Ningde (CN); Shaojie Tian, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 532 days.

(21) Appl. No.: 17/702,653

(22) Filed: Mar. 23, 2022

(65) Prior Publication Data
US 2022/0216518 A1 Jul. 7, 2022

Related U.S. Application Data

(63) Continuation of application No. PCT/CN2020/120305, filed on Oct. 12, 2020.

(30) Foreign Application Priority Data

Oct. 18, 2019 (CN) .............................. 201910996078

(51) Int. Cl.
*H01M 10/0567* (2010.01)
*H01M 4/02* (2006.01)
(Continued)

(52) U.S. Cl.
CPC ....... *H01M 10/0567* (2013.01); *H01M 4/505* (2013.01); *H01M 4/525* (2013.01);
(Continued)

(58) Field of Classification Search
CPC ... H01M 10/052–0525; H01M 10/056; H01M 10/0561; H01M 10/0563;
(Continued)

(56) References Cited

U.S. PATENT DOCUMENTS

2016/0248121 A1\* 8/2016 Uematsu ............... H01M 4/505
2017/0084956 A1\* 3/2017 Zhuang ................. H01M 4/623
(Continued)

FOREIGN PATENT DOCUMENTS

CN    105355975 A    4/2016
CN    107293792 A    10/2017
(Continued)

OTHER PUBLICATIONS

Machine translation of Shin, KR-20150032416-A. Originally available May 20, 2008. (Year: 2008).\*
(Continued)

*Primary Examiner* — Jonathan Crepeau
*Assistant Examiner* — Jacob Buchanan
(74) *Attorney, Agent, or Firm* — K&L Gates LLP

(57) ABSTRACT

This application provides an electrolyte for lithium-ion battery, a lithium-ion battery, a battery module, a battery pack, and an apparatus. The electrolyte provided in this application includes a non-aqueous solvent, and a lithium salt and an additive that are dissolved in the non-aqueous solvent, and the additive includes a cyclosiloxane and a fluoroether. This application further provides a lithium-ion battery including the foregoing electrolyte. In the electrolyte provided in this application, the cyclosiloxane and the fluoroether are used together to synergistically react on a surface of the positive electrode, combining silicon and oxygen containing groups and fluorine and oxygen containing groups to form an interface film containing silicon, oxygen, and fluorine, which not only ensures density of the
(Continued)

interface film, but also strengthens oxidation resistance and thermal stability of the interface film, greatly improving both storage performance and cycling performance of the lithium-ion battery under high temperature.

11 Claims, 3 Drawing Sheets

(51) Int. Cl.
    *H01M 4/505*      (2010.01)
    *H01M 4/525*      (2010.01)
    *H01M 10/0525*      (2010.01)
    *H01M 10/0569*      (2010.01)

(52) U.S. Cl.
    CPC ... *H01M 10/0525* (2013.01); *H01M 10/0569* (2013.01); *H01M 2004/028* (2013.01); *H01M 2300/004* (2013.01)

(58) Field of Classification Search
    CPC ........... H01M 10/0564; H01M 10/0566–0569; H01M 10/24–26; H01M 4/50–525
    See application file for complete search history.

(56) References Cited

U.S. PATENT DOCUMENTS

| | | | |
|---|---|---|---|
| 2018/0175464 A1* | 6/2018 | Kim | H01M 10/6555 |
| 2019/0312307 A1* | 10/2019 | Itabashi | H01M 10/0525 |

FOREIGN PATENT DOCUMENTS

| | | | | |
|---|---|---|---|---|
| CN | 109155438 A | | 1/2019 | |
| CN | 110323487 A | | 10/2019 | |
| CN | 110767939 A | | 2/2020 | |
| EP | 3467929 A1 | | 4/2019 | |
| JP | 2009163939 A | | 7/2009 | |
| KR | 20080043992 A | | 5/2008 | |
| KR | 20150032416 A | * | 5/2008 | ........ H01M 10/0569 |
| WO | WO2014/013850 A1 | | 1/2014 | |
| WO | 2015069271 A1 | | 5/2015 | |
| WO | WO-2019139952 A1 | * | 7/2019 | ............ H01M 4/133 |

OTHER PUBLICATIONS

The extended European search report received in the corresponding European application 20877732.6, mailed Jul. 4, 2023.

Ningder Age New Energy, Notice of Allowance, CN201910996078.6, Oct. 18, 2019, 4 pgs.

Xiong Shizhao, Study of novel electrolyte and compatibility to lithium electrode for lithium-sulfur batteries, dissertation, Apr. 2015, 189 pgs, Graduate School of National University of Defense Technology, Changsha, Hunan, P.R. China, 189 pgs.

Tsuyoshi Inose, et al., Poly-ether modified siloxanes as electrolyte additives for rechargeable lithium cells, journal, May 30, 2006, 10 pgs, Gunma University, Kiryu, Gunma, Japan, 10 pgs.

International Search Report and Written Opinion, PCT/CN2020/120305, Dec. 31, 2020, 12 pgs.

Ningde Age New Energy, First Office Action, CN201910996078.6, Sep. 22, 2020, 8 pgs.

* cited by examiner

ELECTROLYTE FOR LITHIUM-ION BATTERY, LITHIUM-ION BATTERY, BATTERY MODULE, BATTERY PACK, AND APPARATUS

CROSS-REFERENCE TO RELATED APPLICATIONS

This application is a continuation application of PCT Patent Application No. PCT/CN2020/120305, entitled "ELECTROLYTE FOR LITHIUM-ION BATTERY, LITHIUM-ION BATTERY, BATTERY MODULE, BATTERY PACK, AND DEVICE" filed on Oct. 12, 2020, which claims priority to Chinese Patent Application No. 201910996078.6, filed with the State Intellectual Property Office of the People's Republic of China on Oct. 18, 2019, and entitled "ELECTROLYTE FOR LITHIUM-ION BATTERY, LITHIUM-ION BATTERY, BATTERY MODULE, BATTERY PACK, AND APPARATUS", all of which are incorporated herein by reference in their entirety.

TECHNICAL FIELD

This application relates to the field of batteries, and in particular, to an electrolyte for lithium-ion battery, a lithium-ion battery, a battery module, a battery pack, and an apparatus.

BACKGROUND

At present, lithium-ion batteries have been applied as a power source on a large scale in the automobile industry. As lithium-ion batteries are a good alternative to fuel, people are imposing higher requirements on their service life. Increasing energy density of lithium-ion batteries can not only improve their endurance capability, but also reduce the cost per unit power. One of effective methods to increase the energy density of lithium-ion batteries is to develop positive electrode materials with high specific capacity for lithium-ion batteries. The energy density can be increased by, for example, increasing gram capacity of active materials, or reducing weight of structural parts and auxiliary materials. High-nickel positive electrode materials are one of the best solutions to improve the energy density for their higher theoretical specific capacity than other positive electrode materials.

However, present lithium-ion batteries still have problems such as unsatisfactory storage performance and cycling performance under high temperature.

SUMMARY

In view of the problems described in the background, the purpose of this application is to provide an electrolyte for lithium-ion battery, a lithium-ion battery, a battery module, a battery pack, and an apparatus. Storage performance and cycling performance of the lithium-ion battery under high temperature have been significantly improved.

To achieve the above objective, a first aspect of this application provides an electrolyte for lithium-ion battery, including a non-aqueous solvent, and a lithium salt and an additive that are dissolved in the non-aqueous solvent, and the additive includes a cyclosiloxane and a fluoroether.

A second aspect of this application provides a lithium-ion battery including a positive electrode plate, a negative electrode plate, a separator between the positive electrode plate and the negative electrode plate, and an electrolyte, where the electrolyte is the electrolyte provided in the first aspect of this application.

A third aspect of this application provides a battery module including the lithium-ion battery in the second aspect of this application.

A fourth aspect of this application provides a battery pack including the battery module in the third aspect of this application.

A fifth aspect of this application provides an apparatus including the lithium-ion battery in the second aspect of this application, and the lithium-ion battery serves as a power source for the apparatus.

Compared with the prior art, this application includes at least the following beneficial effects.

The electrolyte provided in this application includes the cyclosiloxane additive and the fluoroether additive. Since silicon is more stable than carbon, the cyclosiloxane can have ring-opening polymerization reaction at high temperature to form a film on a surface of the positive electrode of the lithium-ion battery, thereby stabilizing a positive electrode interface. In addition, epoxy groups, with strong electron-withdrawing properties, can capture metal ions such as cobalt and manganese, thereby inhibiting deterioration of battery performance caused by dissolution of these ions. Since oxidation potential of the fluoroether is lower than that of the non-aqueous solvent, the fluoroether will preferentially form a film on a surface of the positive electrode of the lithium-ion battery, thereby inhibiting oxidative decomposition of the non-aqueous solvent. In addition, due to existence of fluoroalkyl atoms, the interface film formed by the fluoroether on the positive electrode of the lithium-ion battery has good thermal stability. However, the interface film formed by the fluoroether on the positive electrode is not dense enough to stabilize its appearance when the positive electrode changes in volume due to intercalation and deintercalation of lithium ions. The interface film formed by the cyclosiloxane on the positive electrode is prone to be decomposed during operation of the battery due to the poor oxidation resistance of alkyl groups. In the electrolyte provided in this application, the cyclosiloxane and the fluoroether are used together to synergistically react on a surface of the positive electrode, combining silicon (and oxygen) containing groups and fluorine (and oxygen) containing groups to form an interface film containing silicon, oxygen, and fluorine, which not only ensures density of the interface film, but also strengthens oxidation resistance and thermal stability of the interface film, greatly improving both storage performance and cycling performance of the lithium-ion battery under high temperature.

The battery module, the battery pack, and the apparatus in this application include the lithium-ion battery, and therefore have at least the same advantages as that of the lithium-ion battery.

Figure 1:
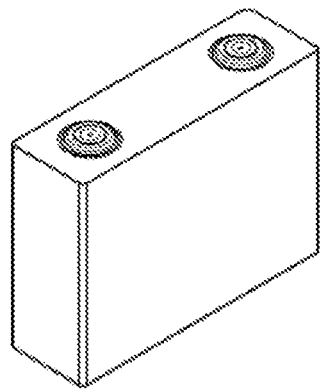
FIG. 1 is a perspective view of an embodiment of a battery.

Reference signs are described as follows:
1. battery pack;
    2. upper box body;
    3. lower box body;
    4. battery module;
    5. battery;
        51. housing;
        52. electrode assembly; and
        53. top cover assembly.

DESCRIPTION OF EMBODIMENTS

The following describes in detail an electrolyte for lithium-ion battery, a lithium-ion battery, a battery module, a battery pack, and an apparatus according to this application.

Electrolyte

An electrolyte for lithium-ion battery in a first aspect of this application includes a non-aqueous solvent, and a lithium salt and an additive that are dissolved in the non-aqueous solvent, where the additive includes a cyclosiloxane and a fluoroether.

In the electrolyte provided in this application, the cyclosiloxane and the fluoroether are used together to synergistically react on a surface of the positive electrode of the lithium-ion battery, combining silicon (and oxygen) containing groups and fluorine (and oxygen) containing groups to form an interface film containing silicon, oxygen, and fluorine on the surface of the positive electrode. The interface film has not only great density, but also better oxidation resistance and thermal stability, greatly improving both storage performance and cycling performance of the lithium-ion battery under high temperature.

In some embodiments, the cyclosiloxane is selected from cyclotrisiloxane represented by formula I and/or cyclotetrasiloxane represented by formula II:

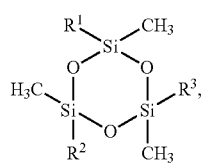

(I)

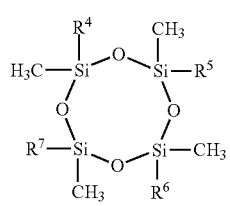

(II)

where $R^1$ to $R^7$ are each independently selected from C1 to C4 alkyl or vinyl.

Further optionally, the cyclosiloxane is selected from one or more of hexamethylcyclotrisiloxane represented by formula I-1, octamethylcyclotetrasiloxane represented by formula II-1, or tetramethyltetravinylcyclotetrasiloxane represented by formula II-2.

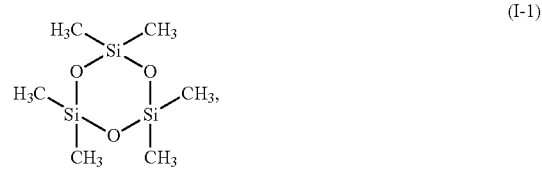

(I-1)

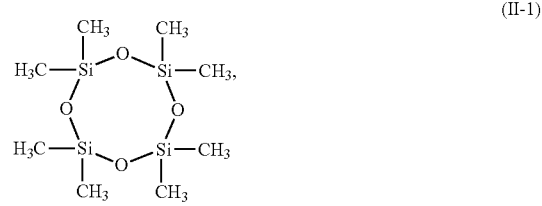

(II-1)

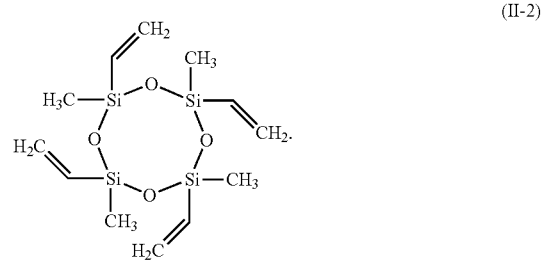

(II-2)

In some embodiments, the fluoroether has a structure represented by formula III:

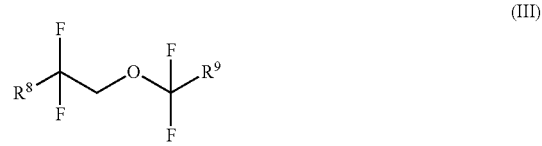

(III)

where $R^8$ and $R^9$ are each independently selected from a hydrogen atom, a fluorine atom, or a fluoroalkyl group that has 1 to 6 carbon atoms.

Further optionally, the fluoroether is selected from one or more of 1H,1H,5H-octafluoropentyl-1,1,2,2-tetrafluoroethyl ether represented by formula III-1, 1,1,2,2-tetrafluoroethyl-2,2,2-trifluoroethyl ether represented by formula III-2, or 1,1,2,2-tetrafluoroethyl-2,2,3,3-tetrafluoropropyl ether represented by formula III-3:

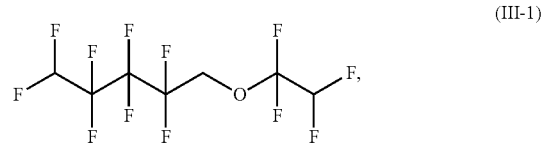

(III-1)

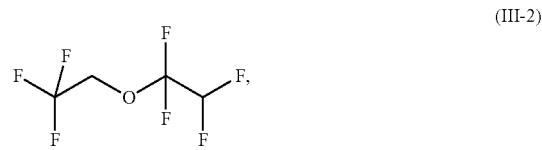

(III-2)

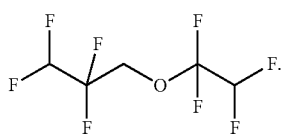
(III-3)

In some embodiments, a mass percentage of the cyclosiloxane in the electrolyte is 0.10% to 2%.

In some embodiments, a mass percentage of the fluoroether in the electrolyte is 0.2% to 2%.

In some embodiments, the mass percentage of the cyclosiloxane in the electrolyte is 0.10% to 2%; and the mass percentage of the fluoroether in the electrolyte is 0.2% to 2%.

Adjusting percentages of the cyclosiloxane compound and the fluoroether in the electrolyte can mediate and improve high-temperature cycling performance and high-temperature storage performance. Amounts of the cyclosiloxane compound and fluoroether used have great impact on high-temperature storage volume swelling rate, low-temperature discharge, and high-temperature cycling performance of the lithium-ion battery. In a case that the additive contents go beyond the ranges provided by this application, the high-temperature storage volume swelling rate, low-temperature discharge, and high-temperature cycling performance of the lithium-ion battery cannot be obviously improved. Moreover, when the cyclosiloxane compound content is excessively high, performance of the battery will not be significantly improved due to lower solubility; and when the fluoroether content is excessively high, the interface film impedance will increase, even deteriorating the low-temperature performance of the battery.

In some embodiments, the additive of the electrolyte provided by this application further includes one or more of ethylene sulfate, methylene disulfonate, tris(trimethylsilane) phosphate, or tris(trimethylsilane) borate. The foregoing additive may further change contents of the positive electrode interface film and reduce the interface film impedance to improve the low-temperature performance of the lithium-ion battery. The mass percentage of the additive in the electrolyte may optionally be 0.1% to 2%.

In some embodiments, the non-aqueous solvent is selected from one or more of propylene carbonate, ethylene carbonate, dimethyl carbonate, diethyl carbonate, dipropyl carbonate, ethyl methyl carbonate, methyl propyl carbonate, vinylene carbonate, ethylene carbonate, fluoroethylene carbonate, methyl formate, ethyl acetate, methyl butyrate, methyl acrylate, ethylene sulfite, acrylic sulfite, dimethyl sulfate, diethylsulfite, 1,3-propanesulfonate, methylene disulfonate, anhydride, N-methylpyrrolidone, N-methylformamide, N-methylacetamide, acetonitrile, N,N-dimethylformamide, sulfolane, dimethyl sulfoxide, methyl sulfide, γ-butyrolactone, tetrahydrofuran, fluorinecyclic-containing organic esters, sulfur-containing cyclic organic esters, or cyclic organic esters with unsaturated bonds.

Lithium-Ion Battery

A lithium-ion battery in a second aspect of this application includes a positive electrode plate, a negative electrode plate, a separator between the positive electrode plate and the negative electrode plate, and an electrolyte, where the electrolyte is the electrolyte in the first aspect of this application.

Figure 2:
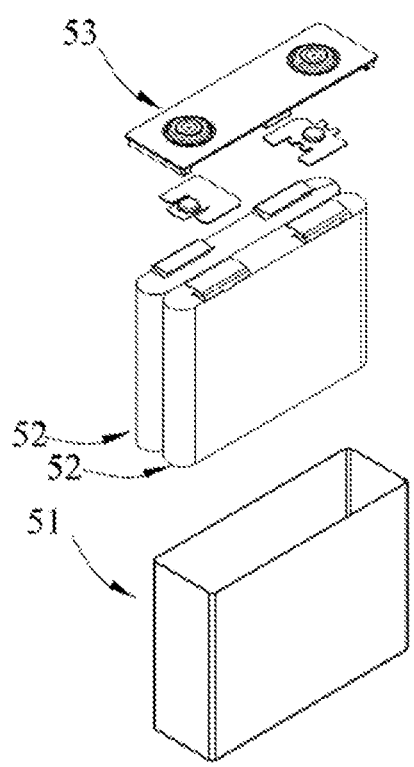
FIG. 2 is an exploded view of an embodiment of the battery.

FIG. 1 is a perspective view of an embodiment of a lithium-ion battery 5. FIG. 2 is an exploded view of FIG. 1.

With reference to FIG. 1 and FIG. 2, the lithium-ion battery 5 includes a housing 51, an electrode assembly 52, a top cover assembly 53, and an electrolyte (not shown). The electrode assembly 52 is accommodated in the housing 51. The quantity of electrode assemblies 52 is not limited, which may be one or more.

It is noted that the lithium-ion battery 5 shown in FIG. 1 is a tank type battery, but is not limited thereto. The lithium-ion battery 5 may be a pouch type battery, which means that the housing 51 is replaced by a metal plastic film and the top cover assembly 53 is omitted.

In the lithium-ion battery in this application, the positive electrode plate contains a material that can extract and accept lithium ions, and the negative electrode plate contains a material that can accept and extract lithium ions. The electrolyte provided in this application is applicable to various lithium-ion battery systems, helping to improve high-temperature performance and low-temperature performance of various lithium-ion batteries.

In some embodiments, in the lithium-ion battery provided in this application, the positive electrode plate includes a positive electrode current collector and a positive electrode active material layer arranged on at least one surface of the positive electrode current collector, and the positive electrode active material layer includes $LiNi_{(1-x-y)}Co_xM_yO_2$, M being selected from Mn or Al, where $0 \le x \le 0.5$, $0 \le y \le 0.5$, and $0 \le x+y \le 0.5$. The high-nickel material $LiNi_{(1-x-y)}Co_xM_yO_2$ included in the positive electrode active material layer has become one of selectable positive electrode active materials for lithium-ion batteries with high energy density due to its higher theoretical specific capacity than other positive electrode active materials. However, the high-nickel positive electrode active material has some problems in use. A high nickel content makes oxidation of the high-nickel positive electrode active material extremely strong, resulting that the electrolyte is prone to have side reactions on a surface of the positive electrode; stronger alkaline of the material promotes side reactions; and unstable structure of the material makes it easy to elute nickel, cobalt, and manganese ions. All these problems lead to safety risks such as shorter service life and gassing of the lithium-ion battery. The cyclosiloxane compound included in the electrolyte in this application can capture metal ions. In addition, the interface film formed by using the cyclosiloxane and the fluoroether together can well stabilize a positive electrode interface. Therefore, the electrolyte in this application allows the lithium-ion battery including the high-nickel positive electrode active material to have better high-temperature performance.

Those skilled in the art may select a suitable method to prepare the positive electrode plate. For example, the following steps may be included: mixing the positive electrode active material, a binder, and a conductive agent to form a slurry, and applying the slurry on the positive electrode current collector.

In the positive electrode plate in this application, the positive electrode active material layer may further include a conductive agent and a binder. The conductive agent and the binder are not limited to any specific types or proportions, but may be selected according to actual needs. The binder typically includes fluorine-containing polyolefin binders. With respect to the fluorine-containing polyolefin binders, water is usually a good solvent. In other words, the fluorine-containing polyolefin binders usually exhibit good solubility in water. For example, the fluorine-containing polyolefin binders may include but not be limited to polyvinylidene fluoride (PVDF), vinylidene fluoride copolymer or their modified (for example, modified by carboxylic acid, acrylic acid, or acrylonitrile) derivatives. In the positive electrode material layer, for the mass percentage of the binder, the amount of the binder used may not be too high because of the poor conductivity of the binder. In some embodiments, the mass percentage of the binder in the positive electrode active substance layer is less than or equal to 2 wt %, so as to obtain lower impedance of the electrode plate. The conductive agent of the positive electrode plate may be various conductive agents suitable for lithium-ion batteries in the field, and for example, may include but not be limited to a combination of one or more of acetylene black, conductive carbon black, vapor grown carbon fiber (VGCF), carbon nanotubes (CNT), Ketjen black, or the like. The mass of the conductive agent may be 1 wt % to 10 wt % of a total mass of the positive electrode material layer. More optionally, a weight ratio of the conductive agent to the positive electrode active substance in the positive electrode plate is greater than or equal to 1.5:95.5. The positive electrode current collector is also not limited to any specific type, but may be selected according to actual needs. In this application, the positive electrode current collector may typically be a layered body. The positive electrode current collector may typically be a structure or part that can collect current. The positive electrode current collector may be made of various materials suitable to serve as a positive electrode current collector for lithium-ion batteries in the field. For example, the positive electrode current collector may include but not be limited to metal foil, and more specifically, may include but not be limited to nickel foil or aluminum foil.

In the lithium-ion battery in this application, the negative electrode plate typically includes a negative electrode current collector and a negative electrode active material layer on a surface of the negative electrode current collector, and the negative electrode active material layer typically includes a negative electrode active material. The negative electrode active material may be various materials suitable to be the negative electrode active material of a lithium-ion battery in the art, for example, may be but is not limited to a combination of one or more of graphite, soft carbon, hard carbon, carbon fiber, mesophase carbon microspheres, silicon-based material, tin-based material, lithium titanate, or other metals that can form an alloy with lithium. The graphite may be selected from a combination of one or more of artificial graphite, natural graphite, or modified graphite. The silicon-based material may be selected from a combination of one or more of elemental silicon, a silicon-oxygen compound, a silicon-carbon composite, or a silicon alloy. The tin-based material may be selected from a combination of one or more of elemental tin, a tin-oxygen compound, or a tin alloy. The negative electrode current collector may typically be a structure or part that can collect current. The negative electrode current collector may be a variety of materials suitable to serve as the negative electrode current collector of a lithium-ion battery in the art. For example, the negative electrode current collector may include but is not limited to metal foil, and more specifically, may include but not be limited to copper foil and the like.

In the lithium-ion battery in this application, the negative electrode plate may be a lithium plate.

In the lithium-ion battery of this application, the separator may be various materials suitable for lithium-ion batteries in the field, and for example, may include but not be limited to a combination of one or more of polyethylene, polypropylene, polyvinylidene fluoride, kevlar, polyethylene terephthalate, polytetrafluoroethylene, polyacrylonitrile, polyimide, polyamide, polyester, or natural fibers.

Battery Module

Figure 3:
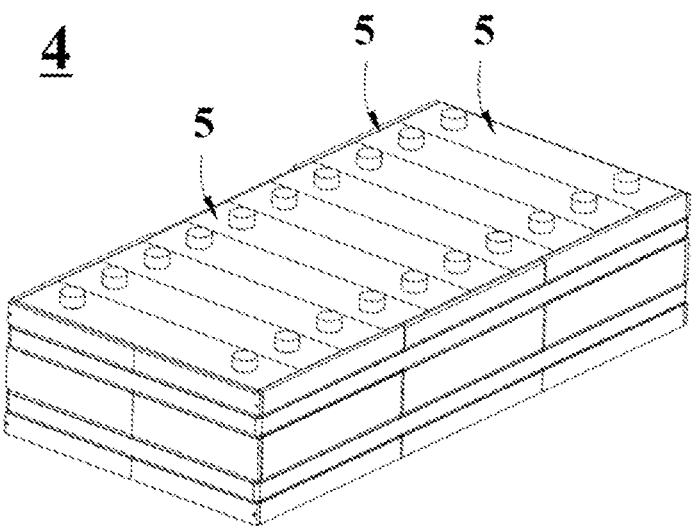
FIG. 3 is a perspective view of an embodiment of a battery module.

FIG. 3 is a perspective view of an embodiment of a battery module 4.

Referring to FIG. 3, the battery module 4 includes a plurality of lithium-ion batteries 5. The plurality of batteries 5 are arranged in a longitudinal direction. The battery module 4 may be used as a power source or an energy storage device. The quantity of lithium-ion batteries 5 included in the battery module 4 may be adjusted based on use and capacity of the battery module 4.

Battery Pack

Figure 4:
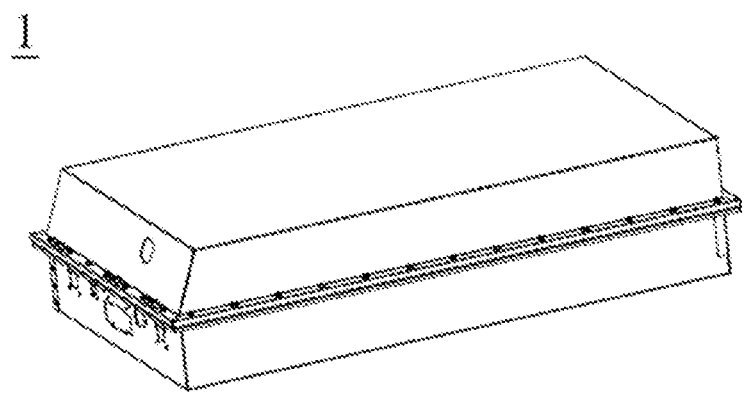
FIG. 4 is a perspective view of an embodiment of a battery pack.
Figure 5:
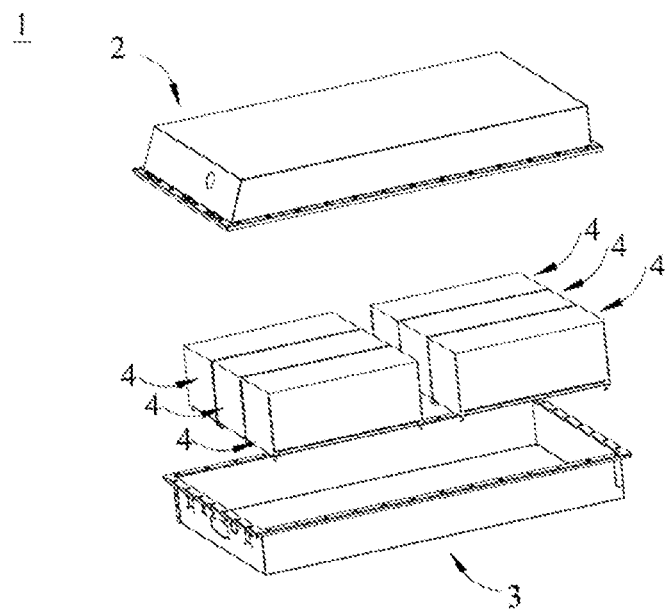
FIG. 5 is an exploded view of FIG. 4.

FIG. 4 is a perspective view of an embodiment of a battery pack 1. FIG. 5 is an exploded view of FIG. 4.

Referring to FIG. 4 and FIG. 5, the battery pack 1 includes an upper box body 2, a lower box body 3, and a battery module 4.

The upper box body 2 and the lower box body 3 are combined to form a space for accommodating the battery module 4. The battery module 4 is disposed in the space formed by the upper box body 2 and the lower box body 3 that are combined. An output electrode of the battery module 4 penetrates through one or both of the upper box body 2 and the lower box body 3 to output power or receive charge from an outer source. The quantity and arrangement of the battery modules 4 used in the battery pack 1 may be determined depending on an actual need. The battery pack 1 may be used as a power source or an energy storage device.

Apparatus

Figure 6:
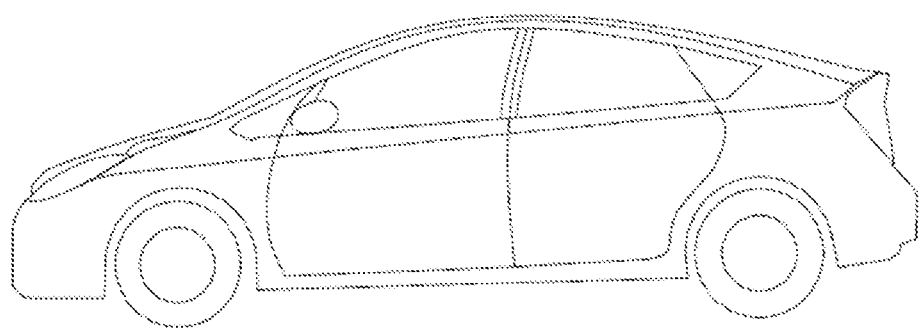
FIG. 6 is a schematic diagram of an embodiment of an apparatus using a battery as a power source.

In FIG. 6, an apparatus that uses the battery 5 is an electric car. Certainly, the apparatus that uses the battery 5 is not limited thereto. Rather, it may be any electric vehicles other than electric cars (for example, an electric bus, a tramcar, an electric bicycle, an electric motorbike, an electric scooter, an electric golf cart, and an electric truck), electric ships, electric tools, electronic devices, and energy storage systems. The electric car may be a battery electric car, a hybrid electric car, or a plug-in hybrid electric car. Certainly, depending on an actual use form, the apparatus provided in the fifth aspect of this application may include the battery module 4 described in the third aspect of this application. Certainly, the apparatus provided in the fifth aspect of this application may alternatively include the battery pack 1 according to the fourth aspect of this application.

This application is further described with reference to specific Examples. It should be understood that these embodiments are merely used to describe this application but not to limit the scope of this application.

Examples 1 to 9 and Comparative Examples 1 to 9

The electrolytes and lithium-ion batteries in Examples 1 to 19 and Comparative Examples 1 to 11 were all prepared according to the following method.

(1) Preparation of a positive electrode plate: A positive electrode active material, a conductive agent carbon black (Super P), and a binder polyvinylidene fluoride (PVDF) were mixed at a mass ratio of 97:1.5:1.5, and added to a solvent N-methylpyrrolidone (NMP). The mixture was stirred by a vacuum mixer to obtain a uniform and transparent positive electrode active material slurry. Then the positive electrode active material slurry was uniformly applied on an aluminum foil positive electrode current collector and dried, followed by cold pressing, edge trimming, cutting, and slitting, to obtain a positive electrode plate.

(2) Preparation of a negative electrode plate: A negative electrode active material, a conductive agent carbon black (Super P), a thickener sodium carboxymethyl cellulose (CMC), and a binder styrene butadiene rubber (SBR) were mixed at a mass ratio of 96.4:1.5:0.5:1.6, and added to a solvent deionized water. The mixture was stirred by a vacuum mixer to obtain a uniform negative electrode active material slurry. Then the negative electrode active material slurry was uniformly applied on a copper foil negative electrode current collector and dried, followed by cold pressing, edge trimming, cutting, and slitting, to obtain a negative electrode plate.

(3) Preparation of a separator: A polyethylene film (PE) was used as a separator.

(4) Preparation of an electrolyte: Ethylene carbonate (EC), ethyl methyl carbonate (EMC), and diethyl carbonate (DEC) were mixed at a mass ratio of 27:3:30:40, and a lithium salt which was 1.1 mol/L LiPF$^6$ was resolved in the mixture solvent. Then cyclosiloxane and fluoroether were added and other additives were added optionally. The resulting mixture was mixed thoroughly to obtain a uniform electrolyte. The specific types and contents in the electrolyte are shown in Table 1. In Table 1, the cyclosiloxane compound content and the fluoroether content are both weight percentages calculated based on a total weight of the electrolyte.

(5) Preparation of a lithium-ion battery: The positive electrode plate, the separator, and the negative electrode plate were stacked in sequence, so that the separator was located between the positive electrode plate and the negative electrode plate, and the stack was wound into a battery cell. The battery cell was packed into a packing housing, with the electrolyte made above injected, followed by sealing, standing, hot pressing, cold pressing, and formation to obtain a lithium-ion battery.

Parameters of secondary lithium-ion batteries in Examples 1 to 19 and Comparative Examples 1 to 11 are shown in Table 1.

TABLE 1

Specific parameters of Examples and Comparative Examples

| | Battery system | Additive 1: cyclosiloxane compound | | Additive 2: fluoroether | | Additive 3: others | |
|---|---|---|---|---|---|---|---|
| | | Type | Content | Type | Content | Type | Content |
| Comparative Example 1 | $LiNi_{0.8}Co_{0.1}Mn_{0.1}O_2$/graphite | / | / | / | / | / | / |
| Comparative Example 2 | $LiNi_{0.8}Co_{0.1}Mn_{0.1}O_2$/graphite | I-1 | 0.05% | / | / | / | / |
| Comparative Example 3 | $LiNi_{0.8}Co_{0.1}Mn_{0.1}O_2$/graphite | I-1 | 0.10% | / | / | / | / |
| Comparative Example 4 | $LiNi_{0.8}Co_{0.1}Mn_{0.1}O_2$/graphite | I-1 | 1.00% | / | / | / | / |
| Comparative Example 5 | $LiNi_{0.8}Co_{0.1}Mn_{0.1}O_2$/graphite | I-1 | 2.00% | / | / | / | / |
| Comparative Example 6 | $LiNi_{0.8}Co_{0.1}Mn_{0.1}O_2$/graphite | I-1 | 2.50% | / | / | / | / |
| Comparative Example 7 | $LiNi_{0.8}Co_{0.1}Mn_{0.1}O_2$/graphite | / | / | III-1 | 0.10% | / | / |
| Comparative Example 8 | $LiNi_{0.8}Co_{0.1}Mn_{0.1}O_2$/graphite | / | / | III-1 | 0.20% | / | / |
| Comparative Example 9 | $LiNi_{0.8}Co_{0.1}Mn_{0.1}O_2$/graphite | / | / | III-1 | 1.00% | / | / |
| Comparative Example 10 | $LiNi_{0.8}Co_{0.1}Mn_{0.1}O_2$/graphite | / | / | III-1 | 2.00% | / | / |
| Comparative Example 11 | $LiNi_{0.8}Co_{0.1}Mn_{0.1}O_2$/graphite | / | / | III-1 | 2.50% | / | / |
| Example 1 | $LiNi_{0.8}Co_{0.1}Mn_{0.1}O_2$/graphite | I-1 | 0.10% | III-1 | 0.20% | / | / |
| Example 2 | $LiNi_{0.8}Co_{0.1}Mn_{0.1}O_2$/graphite | I-1 | 1.00% | III-1 | 1.00% | / | / |
| Example 3 | $LiNi_{0.8}Co_{0.1}Mn_{0.1}O_2$/graphite | I-1 | 1.00% | III-1 | 2.00% | / | / |
| Example 4 | $LiNi_{0.8}Co_{0.1}Mn_{0.1}O_2$/graphite | I-1 | 1.00% | III-1 | 2.00% | Methylene disulfonate | 0.30% |
| Example 5 | $LiNi_{0.8}Co_{0.1}Mn_{0.1}O_2$/graphite | I-1 | 2.00% | III-1 | 1.00% | / | / |
| Example 6 | $LiNi_{0.8}Co_{0.1}Mn_{0.1}O_2$/graphite | I-1 | 2.00% | III-1 | 1.00% | Methylene disulfonate | 0.50% |
| Example 7 | $LiNi_{0.8}Co_{0.1}Mn_{0.1}O_2$/graphite | II-1 | 1.00% | III-1 | 2.00% | / | / |
| Example 8 | $LiNi_{0.8}Co_{0.1}Mn_{0.1}O_2$/graphite | II-2 | 1.00% | III-1 | 2.00% | / | / |
| Example 9 | $LiNi_{0.8}Co_{0.1}Mn_{0.1}O_2$/graphite | II-2 | 1.00% | III-1 | 2.00% | Tris(trimethylsilane) borate | 0.50% |
| Example 10 | $LiNi_{0.8}Co_{0.1}Mn_{0.1}O_2$/graphite | II-1 | 1.00% | III-2 | 2.00% | / | / |
| Example 11 | $LiNi_{0.8}Co_{0.1}Mn_{0.1}O_2$/graphite | II-1 | 1.00% | III-2 | 2.00% | Tris(trimethylsilane) phosphate | 0.50% |
| Example 12 | $LiNi_{0.8}Co_{0.1}Mn_{0.1}O_2$/graphite | II-1 | 1.00% | III-3 | 2.00% | / | / |

TABLE 1-continued

Specific parameters of Examples and Comparative Examples

| | Battery system | Additive 1: cyclosiloxane compound | | Additive 2: fluoroether | | Additive 3: others | |
|---|---|---|---|---|---|---|---|
| | | Type | Content | Type | Content | Type | Content |
| Example 13 | $LiNi_{0.8}Co_{0.1}Mn_{0.1}O_2$/ graphite | II-1 | 1.50% | III-3 | 1.50% | / | / |
| Example 14 | $LiNi_{0.8}Co_{0.1}Mn_{0.1}O_2$/ graphite | I-1 | 1.00% | III-2 | 0.50% | Methylene disulfonate | 0.30% |
| Example 15 | $LiNi_{0.8}Co_{0.1}Mn_{0.1}O_2$/ graphite | II-2 | 2.00% | III-3 | 1.00% | Tris(trimethylsilane) borate | 0.50% |
| Example 16 | $LiNi_{0.6}Co_{0.2}Mn_{0.2}O_2$/ graphite | I-1 | 1.50% | III-1 | 0.50% | Methylene disulfonate | 0.50% |
| Example 18 | $LiNi_{0.5}Co_{0.2}Mn_{0.3}O_2$/ graphite | II-1 | 1.00% | III-3 | 0.50% | Tris(trimethylsilane) borate | 0.30% |
| Example 19 | $LiNi_{0.8}Co_{0.1}Mn_{0.1}O_2$/ (graphite + SiO) | C1 | 2.00% | III-2 | 1.00% | Tris(trimethylsilane) phosphate | 0.30% |

(Note:
"/" means no addition of the corresponding substance, and contents of additive 1, additive 2, and additive 3 all mean mass percentages of the additives in the electrolyte.)

The lithium-ion batteries in Examples 1 to 19 and Comparative Examples 1 to 11 were tested separately as follows.

(1) Volume Swelling Test Under High-Temperature Storage

The lithium-ion battery was left at 25° C. for 30 min. After that, it was charged at a constant current of 1 C to a voltage of 4.3V, and then charged at a constant voltage of 4.3V to a current of 0.05 C. A volume of the lithium-ion battery was measured then and recorded as V0. The lithium-ion battery was placed in a 80° C. thermostat and was taken out 3 days later. A volume of the lithium-ion battery was measured then and recorded as V1. (In this test, the volume of the lithium-ion battery was measured by using a drainage method.)

Volume swelling rate (%) of the lithium-ion battery stored at 80° C. for 3 days=$(V1-V0)/V0 \times 100\%$.

(2) Low-Temperature Discharge Capacity Test

At 25° C., the lithium-ion battery was discharged to 2.8V at 1 C, then charged at a constant current of 0.05 C to 4.3V, and its charge capacity was recorded as CC. Then the temperature of the thermostat was adjusted to −20° C., the lithium-ion battery was discharged to 2.8V at a constant current of 1 C, and its discharge capacity was recorded as CDT. A ratio of the discharge capacity to the charge capacity is a discharge capacity retention rate.

Discharge capacity retention rate (%) of the lithium-ion battery at a specific temperature=$CDT/CC \times 100\%$.

(3) High-Temperature Cycling Test

At 25° C., the battery was discharged at 1 C to 2.8V, and then was subjected to a high-temperature cycling test. The thermostat is heated to 60° C. The battery was charged at a constant current of 1 C to 4.3V, then charged to a current of 0.05 C, and discharged at a constant current of 1 C to 2.8V. A capacity retention rate (%) of the battery was calculated after 500 cycles of such charge and discharge at 60° C.

Capacity retention rate (%) of the battery after 500 cycles at 60° C.=discharge capacity at the 500$^{th}$ cycle/discharge capacity at the first cycle×100%.

Table 2 shows performance test results of Examples 1 to 19 and Comparative Examples 1 to 11.

TABLE 2

Performance test results of Examples and Comparative Examples

| | Volume swelling rate after storage for 3 days at 80° C. | Capacity retention rate under low-temperature discharge at −20° C. | Capacity retention rate after 500 cycles at 60° C. |
|---|---|---|---|
| Comparative Example 1 | 57.00% | 62.90% | 67.60% |
| Comparative Example 2 | 56.50% | 63.10% | 68.00% |
| Comparative Example 3 | 55.20% | 64.10% | 68.90% |
| Comparative Example 4 | 35.80% | 68.40% | 74.60% |
| Comparative Example 5 | 32.80% | 70.50% | 78.50% |
| Comparative Example 6 | 32.40% | 71.00% | 78.80% |
| Comparative Example 7 | 56.40% | 62.80% | 67.90% |
| Comparative Example 8 | 56.30% | 62.70% | 68.80% |
| Comparative Example 9 | 50.30% | 60.50% | 70.40% |
| Comparative Example 10 | 46.30% | 57.60% | 71.80% |
| Comparative Example 11 | 44.10% | 55.90% | 72.00% |
| Example 1 | 53.40% | 63.80% | 69.40% |
| Example 2 | 28.70% | 65.70% | 77.80% |
| Example 3 | 25.50% | 61.70% | 79.40% |
| Example 4 | 25.20% | 63.70% | 80.50% |
| Example 5 | 21.40% | 69.20% | 81.30% |
| Example 6 | 20.90% | 73.20% | 82.50% |
| Example 7 | 24.70% | 62.30% | 80.10% |
| Example 8 | 22.30% | 55.20% | 83.10% |
| Example 9 | 21.80% | 62.90% | 84.00% |
| Example 10 | 25.00% | 63.40% | 79.60% |
| Example 11 | 24.60% | 67.90% | 80.20% |
| Example 12 | 24.30% | 67.20% | 79.70% |
| Example 13 | 22.80% | 68.40% | 80.20% |
| Example 14 | 31.30% | 78.50% | 77.50% |
| Example 15 | 17.90% | 61.50% | 88.60% |
| Example 16 | 14.70% | 82.30% | 90.20% |
| Example 18 | 13.20% | 84.10% | 92.50% |
| Example 19 | 35.70% | 67.80% | 78.50% |

It can be seen from the test results of Comparative Examples 1 to 11 that the amounts of the cyclosiloxane compound and fluoroether used had great impact on high-temperature storage volume swelling rate, low-temperature discharge performance, and high-temperature cycling performance of the lithium-ion battery. In a case that the additive contents went beyond the ranges provided by this application, the high-temperature storage volume swelling rate, low-temperature discharge performance, and high-temperature cycling performance of the lithium-ion battery could not be obviously improved. When the cyclosiloxane compound content was excessively high, performance of the battery would not be significantly improved due to lower solubility; and when the fluoroether content was excessively high, the interface film impedance would increase, deteriorating the low-temperature performance of the battery.

It can be seen from the test results of Example 2 and Comparative Examples 4 and 9 that the high-temperature cycling performance and high-temperature storage performance of the lithium-ion battery were significantly better when using the cyclosiloxane and fluoroether together than using only the cyclosiloxane or only the fluoroether. This is because when only the fluoroether is added in the electrolyte, the interface film formed by the fluoroether on the positive electrode plate is not dense enough to stabilize its appearance when the positive electrode changes in volume due to intercalation and deintercalation of lithium ions. Similarly, when only the cyclosiloxane is added in the electrolyte, the interface film formed by the cyclosiloxane on the positive electrode plate is prone to be decomposed during operation due to poor oxidation resistance of alkyl groups. When the cyclosiloxane and the fluoroether are added together to the electrolyte, the two additives will synergistically react on the surface of the positive electrode, combining silicon (and oxygen) containing groups and fluorine (and oxygen) containing groups to form an interface film containing silicon, oxygen, and fluorine, which not only ensures density of the interface film, but also strengthens oxidation resistance and thermal stability of the interface film, greatly improving both storage performance and cycling performance of the lithium-ion battery under high temperature.

It can be seen from the test results of Examples 3 to 15 that adjusting the cyclosiloxane compound and fluoroether contents in the electrolyte could mediate and improve high-temperature cycling performance and high-temperature storage performance. In addition, adding additives with low impedance such as tris(trimethylsilane) borate allowed the lithium-ion battery to have a better low-temperature performance.

It can be seen from the test results of Examples 16 to 19 that, in lithium-ion battery systems with other positive electrode and negative electrode materials, using the cyclosiloxane compound and fluoroether together in the electrolyte, or further adding other additives with low impedance could also allow the lithium-ion battery to have a better high-temperature performance and a better low-temperature performance.

According to the disclosure and teaching of this specification, a person skilled in the art may make further changes or modifications to the foregoing embodiments. Therefore, this application is not limited to the foregoing disclosure and the described embodiments, and changes or modifications to this application shall also fall within the protection scope of the claims of this application. In addition, although some specific terms are used in this specification, these terms are used only for ease of description, and do not constitute any limitation on this application.

What is claimed:

1. A lithium-ion battery, comprising:
    a positive electrode plate, wherein the positive electrode plate comprises a positive electrode current collector and a positive electrode active material layer arranged on at least one surface of the positive electrode current collector, and the positive electrode active material layer comprises $LiNi_{(1-x-y)}Co_xM_yO_2$, M being selected from Mn or Al, wherein $0 \leq x \leq 0.5$, $0 \leq y \leq 0.5$, and $0 \leq x+y \leq 0.5$;
    a negative electrode plate, wherein the negative electrode plate comprises a negative electrode current collector and a negative electrode active material layer on a surface of the negative electrode current collector, and the negative electrode active material layer comprises graphite;
    a separator between the positive electrode plate and the negative electrode plate; and
    an electrolyte, wherein the electrolyte comprises:
        a non-aqueous solvent, the non-aqueous solvent comprising ethylene carbonate (EC), ethyl methyl carbonate (EMC), and diethyl carbonate (DEC);
        a lithium salt and an additive that are dissolved in the non-aqueous solvent, wherein the lithium salt comprises $LiPF_6$, the additive comprises a first additive, a second additive, and a third additive,
        wherein the first additive is a cyclosiloxane selected from one or more of structures represented by formula I-1, formula II-1, and formula II-2:

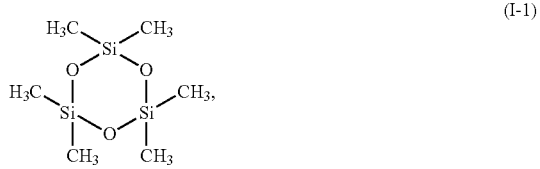

(I-1)

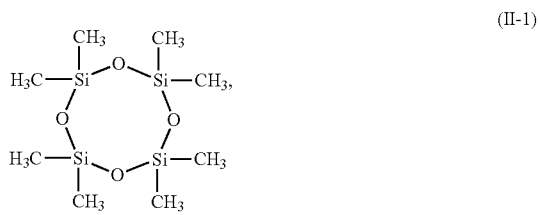

(II-1)

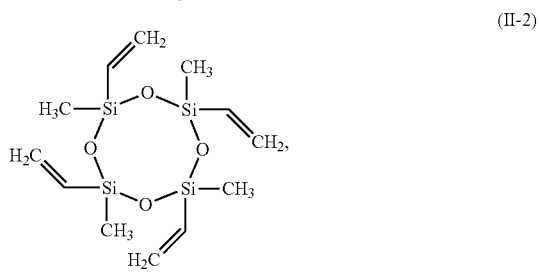

(II-2)

wherein the second additive is a fluoroether selected from one or more of structures represented by formulas III-1 to III-2:

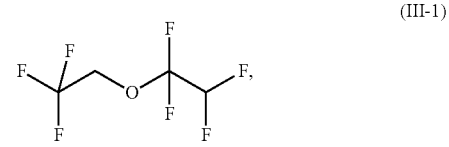

(III-1)

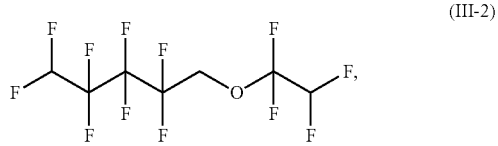

(III-2)

wherein the third additive selected from one or more of ethylene sulfate, methylenemethane disulfonate, tris(trimethylsilane) phosphate, or tris(trimethylsilane) borate, wherein a mass percentage of the first additive in the electrolyte is 1% to 2%, a mass percentage of the second additive in the electrolyte is 0.5% to 2%, and a mass percentage of the third additive in the electrolyte is 0.3% to 0.5%.

2. The lithium-ion battery according to claim 1, wherein the non-aqueous solvent further comprises one or more of propylene carbonate, dimethyl carbonate, dipropyl carbonate, methyl propyl carbonate, vinylene carbonate, ethylene carbonate, fluoroethylene carbonate, methyl formate, ethyl acetate, methyl butyrate, methyl acrylate, ethylene sulfite, acrylic sulfite, dimethyl sulfate, diethylsulfite, 1,3-propane-sulfonate, methylene disulfonate, anhydride, N-methylpyrrolidone, N-methylformamide, N-methylacetamide, acetonitrile, N,N-dimethylformamide, sulfolane, dimethyl sulfoxide, methyl sulfide, γ-butyrolactone, tetrahydrofuran, fluorinecyclic-containing organic esters, sulfur-containing cyclic organic esters, or cyclic organic esters with unsaturated bonds.

3. The lithium-ion battery according to claim 1, wherein the cyclosiloxane is the structure represented by formula II-1.

4. The lithium-ion battery according to claim 1, wherein the cyclosiloxane is the structure represented by formula II-2.

5. The lithium-ion battery according to claim 1, wherein the third additive is tris(trimethylsilane) phosphate.

6. The lithium-ion battery according to claim 1, wherein the additive further comprises tris(trimethylsilane) borate.

7. The lithium-ion battery according to claim 1, wherein the positive electrode active material layer comprises $LiNi_{0.8}Co_{0.1}Mn_{0.1}O_2$.

8. A battery module, comprising the lithium-ion battery according to claim 1.

9. A battery pack, comprising the battery module according to claim 8.

10. An apparatus, comprising the lithium-ion battery according to claim 1, wherein the lithium-ion battery serves as a power source for the apparatus.

11. The apparatus according to claim 10, wherein the apparatus comprises an electric vehicle, a hybrid electric vehicle, a plug-in hybrid electric vehicle, an electric bicycle, an electric scooter, an electric golf cart, an electric truck, an electric vessel, or an energy storage system.

* * * * *

UNITED STATES PATENT AND TRADEMARK OFFICE
CERTIFICATE OF CORRECTION

PATENT NO. : 12,476,280 B2
APPLICATION NO. : 17/702653
DATED : November 18, 2025
INVENTOR(S) : Yongkun Li et al.

Page 1 of 1

It is certified that error appears in the above-identified patent and that said Letters Patent is hereby corrected as shown below:

On the Title Page

Item [30], should read:
Oct. 18, 2019 (CN)..............................201910996078.6

Signed and Sealed this
Sixteenth Day of December, 2025

John A. Squires
*Director of the United States Patent and Trademark Office*